Oct. 8, 1940.                O. O. RIESER                2,217,235
MANUFACTURE OF COMPOSITIONS OF LEAD AND ITS OXIDES
Filed June 27, 1938            3 Sheets-Sheet 1

INVENTOR.
OLIVER O. RIESER.
BY Allen & Allen
ATTORNEYS.

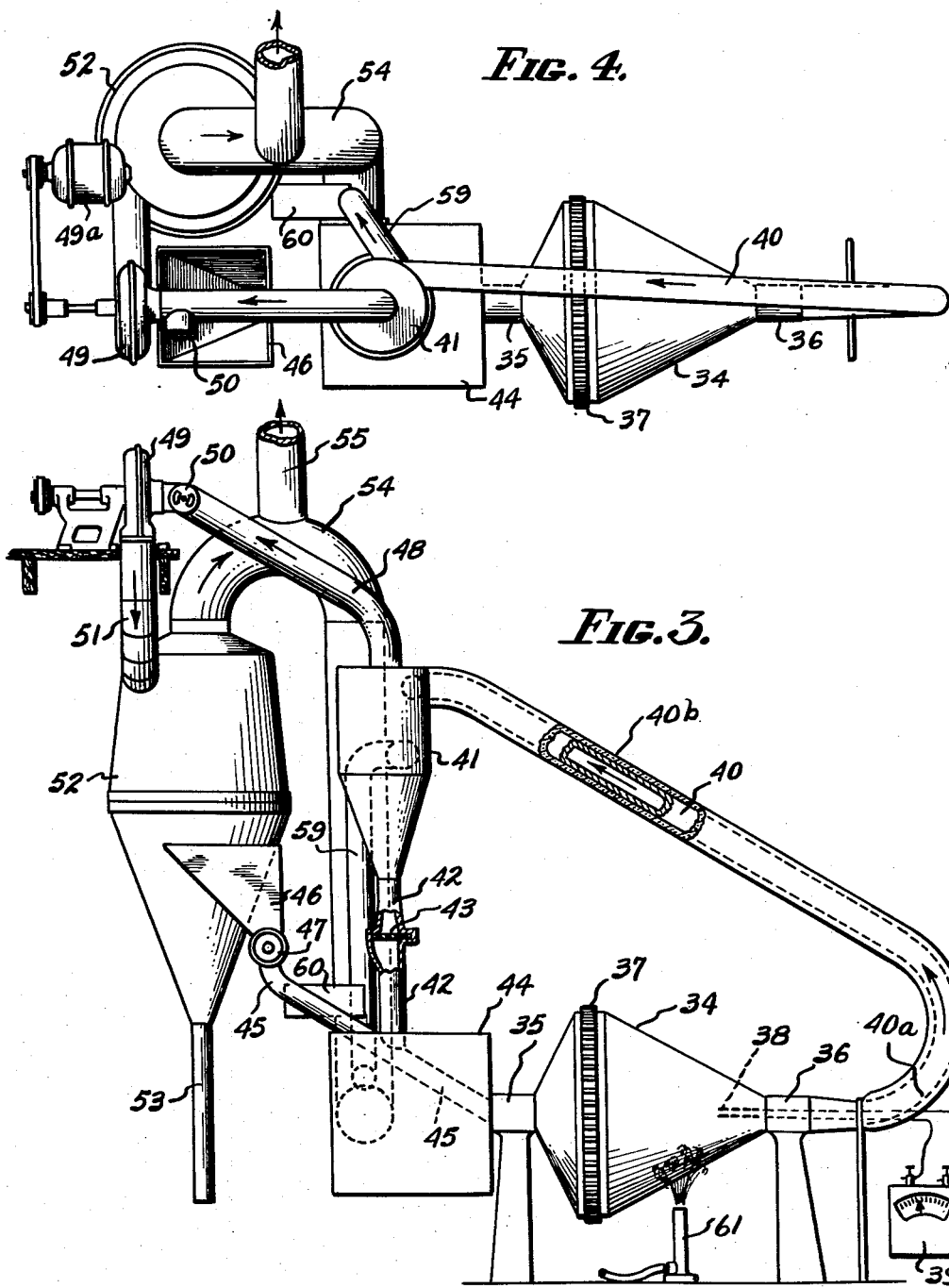

Patented Oct. 8, 1940

2,217,235

UNITED STATES PATENT OFFICE 2,217,235

MANUFACTURE OF COMPOSITIONS OF LEAD AND ITS OXIDES

Oliver O. Rieser, Oak Park, Ill., assignor to The Richardson Company, Lockland, Ohio, a corporation of Ohio Application June 27, 1938, Serial No. 216,035

15 Claims. (Cl. 23—146)

My invention relates generally to the manufacture of dry powders of dark color, the composition of which includes a percentage of metallic lead and also a percentage of oxide of lead, as will hereinafter be set forth. In the copending application of Charles F. Haunz, Serial No. 142,862, filed May 15, 1937, there is set forth a procedure for the manufacture of analogous compositions wherein the lead is first converted into the form of filaments of a diameter say of about .0015 inch and a length ranging up to an inch or longer. The mass of filaments so produced is treated with water and dried. This forms upon the surfaces of the filaments a thin, uniform coating apparently consisting in part of oxides and in part of hydrates. The material thus treated may then be milled in the presence of an oxidizing atmosphere or may otherwise be treated to reduce it to a fine, impalpable powder and at the same time to oxidize it. The result of one operation under the Haunz process as set forth in the said application is the production of a black to neutral gray powder containing approximately 50 per cent of free lead and 50 per cent of oxide calculated on the basis of lead monoxide. It is a reactive powder subject to spontaneous oxidation upon the application of heat to a portion of it, which spontaneous oxidation converts it largely to the monoxide form.

The composition produced as above set forth, is useful for the formation of paste for storage battery plates and the like, for pigments, and for conversion into lead compounds. By controlled roasting treatments, the black or neutral gray powder may be converted into substantially pure litharge or to substantially pure red lead.

Since, however, a powder containing about equal parts oxide and free lead is not quite as desirable for storage battery use as is a powder containing a somewhat greater percentage of oxide calculated upon the basis of lead monoxide, it is usual to give to the powder a controlled heat treatment under oxidizing conditions, as set forth in the copending application of Oliver O. Rieser, Serial No. 148,985, filed June 18, 1937.

A fundamental object of my invention is the provision of a mechanism and process whereby the quality and formula of the final product can be controllably varied, and can be made fixed and uniform if desired, not only for any given run but also for any series of runs.

In the practice of my process I follow a number of the same steps as set forth in the said copending application of Haunz. It is an object of my invention, however, to provide a process whereby certain steps of prior procedures may be eliminated and whereby a fine and uniform end product may be provided having controlled and definite ratios of free lead to oxide, dependent upon the conditions under which the process is carried on. It is also an object of my invention to cheapen the process and shorten its time cycle for the production of material of any given composition; and again it is my object to provide a process wherein, while the content of the composition may be selected at will, a high and invariable standard of uniformity in the final composition for any given run and as between runs may be attained. It is a further object of my invention to provide a novel apparatus whereby the above objects may be attained.

These and other objects of my invention which will be set forth hereinafter or will be apparent to one skilled in the art upon reading these specifications, I accomplish by that apparatus and in that certain process of which I shall now set forth an exemplary embodiment.

Reference is made to the drawings wherein:

Fig. 3 is a view of a type of mill suitable for the practice of my invention, so equipped that my process may be carried on therein.

Fig. 4 is a top plan view of the mill and associated mechanism.

Figure 1:
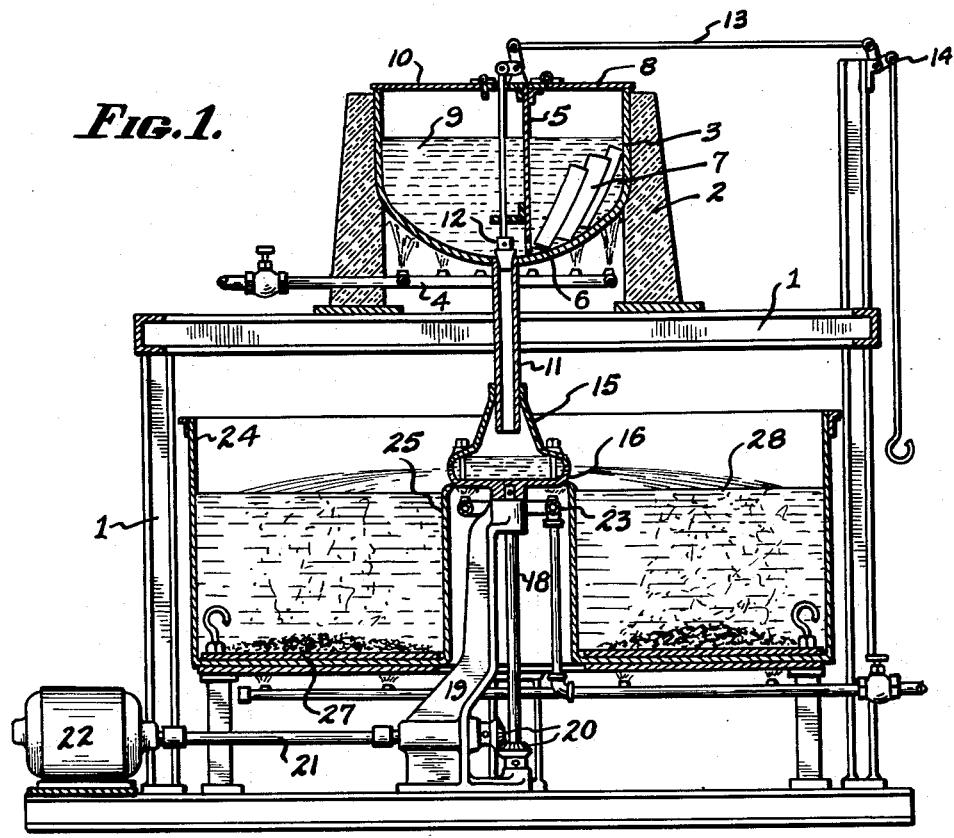
Figure 1 is a sectional view of semi-diagrammatic character of an apparatus for producing lead in filamentary form.

I start with the manufacture of fine and uniform filaments of metal for the reason that uniformity of the starting material is necessary for satisfactory results; and the manufacture of filamentary material appears to be the best commercial method of which I am aware of securing both fineness of subdivision and uniformity of subdivision. I have therefore illustrated in Fig. 1 an apparatus which is suitable for the production of filamentary lead. Upon a framework 1 a cupola 2 is mounted containing a pot 3. This pot may be heated by means of a gas burner arrangement 4. A partition 5 having a perforation 6 near its lower end may divide the pot into two portions, the right hand portion being for the introduction of lead, say in the form of pigs 7, through a cover 8. The melted metal 9 flows through the perforation 6 into the left hand portion of the pot, which may conveniently be provided with a cover 10. The use of the partition prevents the clogging of the outlet means or interference with the valve means by the pig lead. Also dross and the like tends to accumulate on the surface of the melted metal in the right hand portion of the pot whence it may readily be removed. The melted metal is delivered through a conduit 11 into a dispersing head which will presently be described. The conduit, where it connects with the pot 3, may be provided with a valve 12 operated by linkages and levers indicated generally at 13 and 14.

The dispersing or spray head, for forming the metallic filaments, consists of upper (15) and lower (16) cup shaped members held together by bolts 17. The upper cup has a perforation to receive the end of the conduit 11. The lower cup is mounted on a shaft 18 having bearings in a bracket member 19 and connected by bevel gears 20 to a shaft 21 which in turn is connected to a motor 22. By these means the dispersing head may be rotated while it receives molten metal through the conduit 11.

The dispersing head is preferably made in accordance with the teachings of Adolph F. Krauss, as set forth in his copending application Serial No. 96,124, filed August 14, 1936. The two cup shaped portions have reduced rims or edges where they contact each other, and one at least of these rims is knurled by a knurling device so as to produce minute depressions or indentations therein. These depressions, when the cup shaped members are fastened together in opposed relationship, form minute passageways through which the molten metal introduced into the dispersing head may be thrown out by centrifugal force upon the rotation of the device. These passageways are fine and uniform. Since the action of molten lead on iron or steel tends to enlarge the passageways, an advantage of the construction aforesaid is the ease and cheapness with which it may be renewed. For renewal it is only necessary to disassemble the head and lap the reduced edges of the cup shaped members, after which one at least of them may be reknurled. For knurling, the edge is merely contacted by a rotating knurling tool under pressure, so that the metal is indented as distinguished from being cut or machined away.

In use, the metal is introduced into the dispersing head at a temperature above its melting point, but not at such a high temperature as will cause the metal to form droplets after it has left the passageways aforementioned.

With the introduction of the molten metal to the rotating dispersing head, the metal passes through the orifices in the form of fine filaments which congeal rapidly in air. These filaments are of great uniformity of diameter and considerable uniformity as to length. A good working range of dimensions for these filaments is from .007 to .0015 inch or smaller in diameter, and ranging up to an inch or more in length. The spray head may be heated, if desired, by means of a burner 23 located therebeneath.

The filamentary metal may be caught in a hopper 24, having an interior neck 25 to accommodate the mechanism for rotating the dispersing head, and supported upon standards 26. The hopper, as shown, is annular in shape and it may be provided, if desired, with annular means 27 facilitating the removal of the filamentary metal, or the filamentary metal may be scooped out of the hopper from time to time, if preferred. It is also possible to catch the filamentary metal in water 28 in the hopper which is sometimes of advantage in avoiding a separate wetting step, but may be undesirable in certain circumstances as where the filamentary metal is to be shipped or stored as such.

The next step of the process is preferably a hydrating treatment. The function of the hydrating treatment is to produce on the surface of the filamentary material a thin film of oxide or hydrate, or both. While the presence of this film may have a direct action in promoting oxidation in subsequent treatments, it has a very important function in this: If bright filamentary metal is introduced into a ball mill, for example, it will tend under the impact of the balls to clot and mass together, so that the advantages of the initially fine and uniform condition of the metal are lost. The presence of a thin film or skin of hydrate or oxide on the surfaces of the filamentary metal prevents the clotting or massing of the lead in the mill even under conditions of relatively elevated temperatures. As a consequence, the production of such a film or skin is commercially necessary for economical processing. If lead filaments are stored under oxidizing conditions for a relatively long period of time, or if they are stored under conditions of considerable humidity, a sufficient skin for the purpose described will be built up on their surfaces. This procedure, however, does not usually accord with the exigencies of commercial production, and for this reason I prefer to follow the hydrating treatment next to be described.

Figure 2:
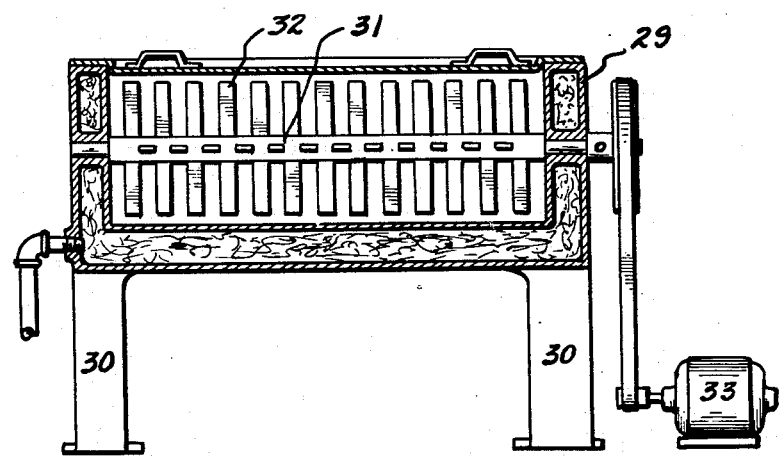
Fig. 2 is a sectional and semi-diagrammatic view of a hydrator.

For rapidly hydrating lead filaments, it is only necessary to wet them thoroughly and dry them in air; and for this purpose different types of apparatus may be employed, as will be clear. The apparatus which I preferably employ is illustrated in Fig. 2 where 29 is a steam jacketed trough or hopper resting upon supports 30. A shaft 31 extends the length of the hopper and bears paddles or agitating devices 32. The shaft will be driven by a suitable source of power such as a motor 33. The lead filaments may be introduced into the hopper dry and water added in the hopper; but it is usually preferable to wet and drain the lead filaments before they are introduced into the hopper since this shortens the drying time. If the filaments have been caught during manufacture in a body of water 28 in the annular hopper 24 of the filament making apparatus of Fig. 1, they may be drained and transferred directly to the hopper of Fig. 2, or if produced dry, they may be wetted and drained in any way desired. The purpose of the device of Fig. 2 is to dry the filamentary metal in the air prior to the introduction of the metal into a milling device. I have found that the type of apparatus disclosed is rapid and efficient in its action and can handle relatively large quantities of the filaments. After the hydrating treatment the filaments have assumed a yellowish or greenish yellow cast, and when dried they may be transferred to the device of Fig. 3.

In Fig. 3 I have shown with certain additional elements a type of ball mill known as the Hardinge mill, which has certain advantages for my purpose; but I am not restricted to the use of this mill since I may employ ball mills, impact or rod mills, or mills of other types. The Hardinge mill comprises a double conical casing or shell 34 which is mounted on trunnions or bearings 35, 36 and is arranged to be rotated in any suitable manner, as by means of a sprocket or gear 37 attached to the casing and driven from a prime mover by means of a chain or gear. The material to be treated is fed into the mill through the hollow trunnion in the bearing 35, and air is also introduced preferably at this end. The material being operated upon, preferably together with suitable balls or impact devices, is contained in the hopper. The elongated conical form of the exit end of the mill allows the finer materials to move toward an exit through a hollow trunnion in the bearing 36, whereas the larger and heavier particles gravitate toward the lowest part of the casing and tend to remain in the mill. In the hopper of this device concurrent attrition or milling and oxidation of the finely divided lead filaments occurs. The process is rapid, and there will be a continuous ingress and egress of materials to and from the mill.

One important feature of my process, however, is control of the conditions within the casing to produce the particular composition of material desired. To this end I locate within the casing, as indicated at 38, a thermo-couple and connect this with a temperature reading and/or recording device located in a position of convenient access to the operator and indicated at 39. Also I provide means for applying heat to the hopper as may be desired; and I have indicated at 61 a burner for this purpose. In ordinary operations all that is required is a burner for gas or other fuel so arranged that it may be placed beneath the casing of the mill 34 to heat it, and withdrawn from that position, as may be desired. The manner in which temperature control is effected during the operation of the process will be taken up hereinafter, and I shall now address my description to the means for securing additional important factors of control.

In my apparatus the feeding of the mill may be continuous or intermittent as desired, and material is being continuously withdrawn from the mill; but it is necessary for complete uniformity and for the production of the finer grades of material that there be recirculation through the mill and remilling of materials which are not in final condition. In order to achieve these ends, I associate with the mill certain apparatus which I shall now describe.

Considering first material leaving the exit end of the mill, it will be noted that it passes through a conduit 40 and into a preliminary centrifugal classifier 41. Here the coarser materials are separated out and pass downwardly through a conduit 42 containing a rubber flap valve or check valve 43. A rotary valve may likewise be used, powered by a suitable motor. The conduit 42 enters a casing 44 at the entrance side of the mill, and within this casing it is connected to another conduit 45 which feeds directly into the hollow trunnion in the bearing 35 at the entrance side of the mill. Outside the casing 44 the conduit 45 is provided with a feeding hopper 46 and a rotary type feeding valve 47. The fresh hydrated metallic filaments are introduced into the hopper 46 and pass through the rotary valve 47 and the conduit 45, into the mill, along with the coarser materials from the preliminary separator 41 through the conduit 42.

The finer materials from the preliminary classifier 41 are carried upwardly through a conduit 48 to a blower 49, which has a suitable prime mover 49a. The conduit 48 is provided with a bleeder 50 to admit new air into the system. The finer materials from the preliminary classifier 41 together with such fresh air as is admitted to the system are delivered by means of a conduit 51 to a main centrifugal separator 52. The separator 52 is so arranged that the materials in finished form are caught in the bottom thereof and may be withdrawn through a conduit 53. The air outlet of the centrifugal separator 52 is a conduit 54 which passes downwardly as indicated in the several figures and connects with the casing 44. The casing 44 is open to the mill through the hollow trunnion in the bearing 35 so that recirculation of air is obtained in the system. Thus air from the main centrifugal separator 52 and such materials as may be entrained therein will be returned to the mill 34.

Figure 5:
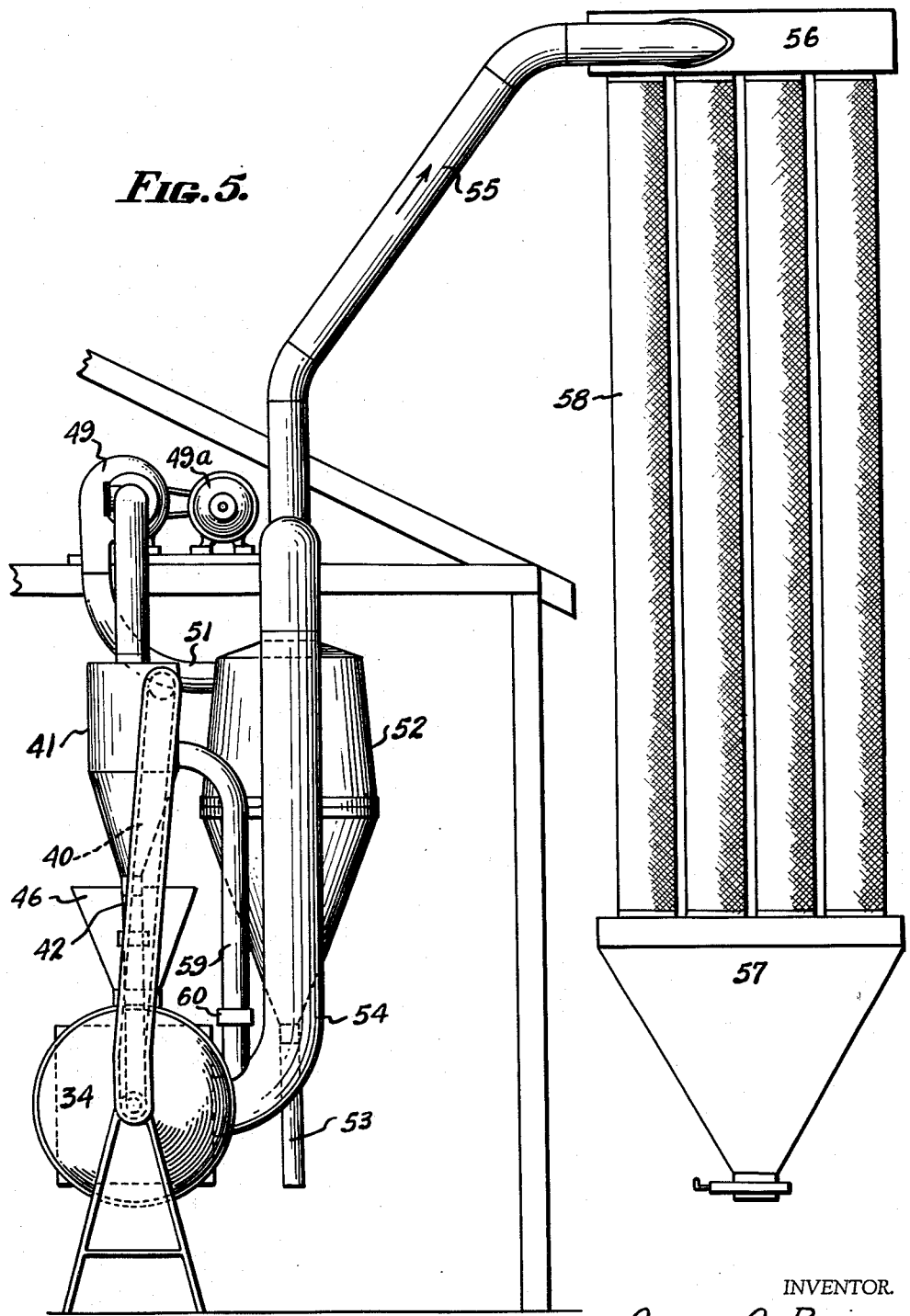
Fig. 5 is an elevational view of the mill endwise, with associated parts, showing also the bag arrangement.

The conduit 54 has a branch pipe or conduit 55 which goes to a bag arrangement shown in Fig. 5. This is a common "bag house" arrangement comprising an upper header 56 connected to a lower header and hopper 57 by a series of cloth tubes or bags 58. The bag arrangement is the chief means for egress of air from the system since the system is otherwise substantially sealed so as to prevent loss of the material being operated upon, and so as to eliminate the hazard to health. The cloth of the bags 58 is of such fineness of weave as to permit egress of air but to hold back materials entrained in the air, which materials fall down through the bags or tubes and collect in the lower hopper member 57.

The degree of preliminary classification carried on in the device 41 is controlled by the quantity of air admitted to the device 41 through a conduit 59, which connects this device with the casing 44. It will be understood that the casing 44 is at higher than atmospheric pressure due to the action of the fan 49. The conduit 59 is provided as at 60 with a so-called "mesh valve" which controls the flow of air through the conduit 59 to the preliminary classifier 41 and controls the degree and nature of the classification occurring therein.

The system as has been indicated is a sealed system. Sharp bends are avoided in the several conduits so as to prevent the collection of materials therein. In producing extremely finely divided materials it may be found advisable to provide a scraper or agitator in the gooseneck 40a of the conduit 40 to prevent the collection of materials at that point. Instead of this, I have employed vibrating devices, of electromagnetic or electro-mechanical character at this and various other points in the system to keep in suspension in the air stream materials which might otherwise collect in pockets. Since heat is a factor of control, it is within the scope of my invention to insulate, as at 40b, such portions of the conduits, casings, headers and separator devices as may be found advisable.

It will be noted that the filamentary metal enters the system through the hopper 46 and conduit 45, and is introduced into the mill 34. Here it is milled in the oxidizing atmosphere the nature of which can be controlled, as I shall presently point out. The temperature within the hopper is read on the device 39 and the burner 61 is applied or removed as may be found necessary. The material leaving the mill is carried through the conduit 40 to the preliminary classifier 41 where the degree of classification is carefully controlled as aforesaid, whence the coarser materials are returned to the mill for reprocessing through the conduit 42, and whence the finer materials pass through the conduit 48 and the blower 49 and the conduit 51 to the separator 52. The amount of air entering the system is controlled through the bleeder device 50. Thus the conditions in the mill as to the oxidation of the materials are carefully controlled. This control is of importance in connection with the heat control; and it is possible to reach relatively high temperatures in the mill with the highly reactive materials formed and without having the materials enter a state of spontaneous combustion. The finished product is delivered from the separator 52 at 53. The bag device acts as the means for relieving air pressure in the system and serves to separate from outgoing air any materials entrained therein.

It will be noted that the system also involves recirculation of the air for atmosphere control and so that heat is conserved in the system.

With the various features of control hereinabove set forth I can produce consistently and uniformly a wide variety of materials of different metal and oxide contents and of different fineness of subdivision. For example, in an exemplary installation, by keeping the temperature within the mill 34 as read on the recording device 39 at about 550 degrees, I can produce a material (by correctly adjusting the mesh valve 60 so as to control the degree of classification and recirculation of the material, and by correctly adjusting the bleeder 50) which contains 32% of free lead and 68% of oxide of lead calculated upon the basis of lead monoxide, which material will have a scot value of 26. In the particular apparatus referred to the production of this material will range between 175 to 200 pounds per hour. By differently adjusting the mesh valve 60 and the bleeder 50 and keeping the temperature within a working range of say 400 to 600 degrees F. I can secure a material containing 22% of free lead and 78% of oxide of lead calculated on the basis of lead monoxide. This material will have a scot value of 22 and the production will be found to have dropped to about 125 pounds per hour, indicating a higher degree of recirculation and reprocessing. Similarly by allowing the temperature to drop somewhat, say to 450 degrees or thereabouts, I can secure a finely divided material containing approximately equal percentages of lead and lead oxide.

The figures which have been given above are exemplary only of operations which may be carried on with the apparatus and in accordance with the process which I have described. It is not to be understood that the relative percentages of lead and lead oxide are bound up with the matter of fineness of subdivision of the materials. The degree and rapidity of oxidation of the material can be controlled and varied in the mill 34 both by control of the temperature, as hereinabove set forth, and by control of the amount of fresh air, i. e. oxygen, admitted to the system, so that with my apparatus and in accordance with my process I can consistently secure materials of the same formulae but different fineness of sub-division as well as materials having different formulae and the same fineness of sub-division.

Modifications may be made in my invention without departing from the spirit of it.

Having thus described my invention, what I claim as new and desire to secure by Letters Patent is:

1. A process of producing a composition of lead and its oxides which comprises reducing metallic lead to a finely divided condition, introducing said lead together with impact and abrading means into a mill and milling said lead, dry, in the presence of an oxidizing atmosphere, and controlling the temperature of the lead being milled to a range of substantially from 400 degrees to 600 degrees F. by applying heat thereto to supplement the heat produced by the reaction of lead with oxygen, said finely divided lead initially being coated to prevent coalescence under the action of said abrading means.

2. A process of forming compositions of lead and its oxides which comprises forming a finely divided filamentary lead, wetting and drying said filamentary lead, whereby to form on the surface of the filaments a thin coating, introducing the material thus produced into a closed circulatory system comprising a mill and a classifier, passing the material with an oxidizing atmosphere through said mill in said circulatory system, whereby to oxidize it, and controlling the formula of the oxidized material by controlling the temperature of reaction within said mill.

3. A process of forming compositions of lead and its oxides which comprises forming a finely divided filamentary lead, wetting and drying said filamentary lead, whereby to form on the surface of the filaments a thin coating, introducing the material thus produced into a closed circulatory system comprising a mill and a classifier, passing the material with an oxidizing atmosphere through said mill and said circulatory system, whereby to oxidize it, and controlling the formula of the oxidized material by controlling the temperature of reaction within said mill, by maintaining in said mill a temperature between 300 and 600 degrees.

4. A process of forming compositions of lead and its oxides which comprises forming a finely divided filamentary lead, wetting and drying said filamentary lead, whereby to form on the surface of the filaments a thin coating, introducing the material thus produced into a closed circulatory system comprising a mill and a classifier, passing the material with an oxidizing atmosphere through said mill and said circulatory system, whereby to oxidize it, and controlling the formula of the oxidized material by controlling the temperature of reaction within said mill, separating the oxidized material into two components and returning one of said components to the mill for reprocessing, and further controlling the formula of the final product by controlling the degree of said classification.

5. A process of producing a composition of lead and its oxides which comprises introducing finely divided lead, coated to prevent coalescence in a mill, with air into a mill, controlling the temperature of reaction within said mill, continuously withdrawing material and air from said mill, separating coarser material and continuously returning said coarser material with a portion of said air to said mill, passing the finer material entrained with air through a device for separating the said finer material therefrom for use, and at least at one point in said series of operations adding fresh air to the air being circulated.

6. A process of producing a composition of lead and its oxides which comprises introducing finely divided lead, coated to prevent coalescence in a mill, with air into a mill, controlling the temperature of reaction within said mill, continuously withdrawing material and air from said mill, separating coarser material and continuously returning said coarser material with a portion of said air to said mill, passing the finer material entrained with air through a device for separating the finer material therefrom for use, and at least at one point in said series of operations adding fresh air to the air being circulated, bleeding air from said system, and separating from said last mentioned air solid material therein contained.

7. A process of producing a composition of lead and its oxides which comprises introducing finely divided lead, coated to prevent coalescence in a mill, and air into a mill which forms a part of a closed circulatory system, including a blower, a preliminary classifier and a final separator, controlling the temperature of reaction in said mill, continuously withdrawing oxidized products and air therefrom, and transferring them to said classifier, separating coarser materials therefrom and continuously returning them to said mill, passing finer materials and air to said final separator and withdrawing therefrom a finished product for use, and causing air and entrained particles from said final separator to return to said mill, introducing a portion of said air prior to the time it reaches said mill into said classifier, and controlling the formula of the final product by varying the amount of air introduced as last hereinabove set forth, into said classifier.

8. A process of producing compositions of lead and its oxides which comprises reducing lead to a uniform and finely divided condition, forming a coating on the surfaces of the particles of lead, introducing particles of lead with impact and abrading means and with an oxidizing gas into a mill, withdrawing oxidized material from said mill, separating from said oxidized material portions thereof of predetermined fineness and returning coarser particles to said mill, continuing the miling thereof and the steps hereinabove reciated in a continuous cycle until all parts of the material introduced into the mill are reduced to said predetermined fineness of sub-division, and controlling the formula of the final product by controlling the temperature of reaction in said mill to a temperature of between substantially 400 degrees to 600 degrees F. by applying heat to said mill.

9. A process of producing compositions of lead and its oxides which comprises reducing lead to a uniform and finely divided condition, forming a coating on the surfaces of the particles of lead, introducing particles of lead with impact and abrading means and with an oxidizing gas into a mill, withdrawing oxidized material from said mill, separating from said oxidized material portions thereof of predetermined fineness and returning coarser particles to said mill, continuing the milling thereof and the steps hereinabove recited in a continuous cycle until all parts of the material introduced into the mill are reduced to said predetermined fineness of sub-division, controlling the formula of the final product by controlling the temperature of reaction in said mill to a temperature of between substantially 400 degrees and 600 degrees F by heating it, and further controlling the atmosphere in said mill by locating said mill in a closed circulatory system for air and by controlling the amount of fresh air admitted thereto, while recirculating through the mill air withdrawn from the mill.

10. A process of producing a composition of lead and its oxides which comprises reducing the lead to a divided condition and milling the lead in a mill in the presence of an oxidizing atmosphere, said mill being located in a closed circulatory system for said atmosphere in which said atmosphere is continuously recirculated, controlling the oxidizing effect of said atmosphere irrespective of its rate of movement by the admission of oxidizing gas to said closed circulatory system, removing oxidized material from said mill in said atmosphere, separating said material from said atmosphere and removing it from said circulatory system.

11. A process of producing a composition of lead and its oxides which comprises reducing metallic lead to a finely divided condition, and milling said lead, dry, by subjecting said lead in a mill to the action of impact and abrading means, passing an oxidizing atmosphere through said mill, said atmosphere carrying out of the mill oxidized and milled particles, said mill being located in a closed circulatory system for said atmosphere, and said atmosphere being returned by said system to said mill, so that the oxidizing effect of said atmosphere per unit volume is reduced, controlling the oxidizing effect of said atmosphere per unit volume by controllably introducing oxidizing gas into said system, and removing oxidized material from said system.

12. A process as claimed in claim 11 characterized by the further step of controlling the temperature of the lead being milled to a range of substantially from 400 degrees to 600 degrees F. by applying heat thereto to supplement the heat produced by the reaction of lead with oxygen.

13. A process as claimed in claim 11 characterized by the steps of classifying the material removed by the atmosphere from said mill into finer and coarser portions, removing the finer portion thereof from said system and remilling the coarser portion thereof within said system.

14. A process as claimed in claim 11 characterized by the steps of controllably classifying the material removed by the atmosphere from said mill into finer and coarser portions, returning the coarser portion thereof together with part of said atmosphere to said mill, separating the finer portion thereof from the remaining part of said atmosphere and returning said remaining part of said atmosphere to said mill.

15. A process as claimed in claim 11 characterized by the steps of controllably classifying the material removed by the atmosphere from said mill into finer and coarser portions, returning the coarser portion thereof together with part of said atmosphere to said mill, separating the finer portion thereof from the remaining part of said atmosphere and returning said remaining part of said atmosphere to said mill, and controlling the temperature of the lead being milled to a range of substantially 400 degrees to 600 degrees F. by applying heat thereto to supplement the heat produced by the reaction of lead with oxygen.

OLIVER O. RIESER.